US008603275B2

(12) United States Patent
Piantanida et al.

(10) Patent No.: US 8,603,275 B2
(45) Date of Patent: Dec. 10, 2013

(54) PROCESS AND APPARATUS FOR MANUFACTURING PNEUMATIC TYRES

(75) Inventors: Pier Giuseppe Piantanida, Milan (IT); Andrea Casali, Milan (IT); Fiorenzo Mariani, Biassono (IT)

(73) Assignee: Pirelli Tyre S.p.A., Milan (IT)

( * ) Notice: Subject to any disclaimer, the term of this patent is extended or adjusted under 35 U.S.C. 154(b) by 571 days.

(21) Appl. No.: 12/449,924

(22) PCT Filed: Apr. 23, 2007

(86) PCT No.: PCT/IB2007/051481
§ 371 (c)(1),
(2), (4) Date: Mar. 12, 2010

(87) PCT Pub. No.: WO2008/129363
PCT Pub. Date: Oct. 30, 2008

(65) Prior Publication Data
US 2010/0163158 A1    Jul. 1, 2010

(51) Int. Cl.
*B29D 30/28* (2006.01)
*B29D 30/32* (2006.01)

(52) U.S. Cl.
USPC .................. 156/130.3; 156/130.5; 156/130.7; 156/132; 156/135

(58) Field of Classification Search
USPC ........ 156/111, 126, 130.3, 130.5, 130.7, 131, 156/132, 135
See application file for complete search history.

(56) References Cited

U.S. PATENT DOCUMENTS

| 1,370,100 | A | | 3/1921 | Dykes | |
|---|---|---|---|---|---|
| 2,625,981 | A | * | 1/1953 | Wallace | 156/132 |
| 3,143,450 | A | * | 8/1964 | Barber et al. | 156/126 |
| 4,227,956 | A | * | 10/1980 | Honda et al. | 156/334 |
| 5,693,176 | A | | 12/1997 | Tsutsumi | |
| 6,328,836 | B1 | * | 12/2001 | Ogawa | 156/117 |

(Continued)

FOREIGN PATENT DOCUMENTS

| EP | 0 197 298 A2 | 10/1986 |
|---|---|---|
| EP | 0 770 475 A2 | 5/1997 |

(Continued)

OTHER PUBLICATIONS

Machine translation of EP 0197298, patent document published Oct. 15, 1986.*

(Continued)

*Primary Examiner* — Geoffrey L Knable
(74) *Attorney, Agent, or Firm* — Finnegan, Henderson, Farabow, Garrett & Dunner, L.L.P.

(57) ABSTRACT

In a process of manufacturing pneumatic tires, a carcass sleeve is made which includes at least one carcass ply provided with axially opposite flaps turned up around annular anchoring structures, so as to form respective loops. An outer sleeve is positioned around the carcass sleeve and the latter is radially expanded in order to cause application of same against a radially internal surface of the outer sleeve. After each of the end flaps has been turned up and before radial expansion, only a portion belonging to each of the loops and extending substantially parallel to the respective annular anchoring structure is submitted to a step of carrying out heating under pressure, to make each loop integral with the annular anchoring structure and prevent the turned-up ply/ plies from even partly slipping off, during the subsequent radial-expansion step of the carcass sleeve and vulcanization step of the tire.

32 Claims, 8 Drawing Sheets

(56) References Cited

U.S. PATENT DOCUMENTS

| | | |
|---|---|---|
| 6,709,540 B1 | 3/2004 | Oare et al. |
| 2004/0069391 A1* | 4/2004 | Okada et al. .................. 152/450 |
| 2004/0144470 A1 | 7/2004 | Oare et al. |
| 2005/0028920 A1* | 2/2005 | Roedseth et al. ............. 156/132 |
| 2005/0142238 A1* | 6/2005 | Tsujimoto et al. ............. 425/29 |
| 2007/0095458 A1 | 5/2007 | Kanenari |

FOREIGN PATENT DOCUMENTS

| | | |
|---|---|---|
| EP | 0 980 749 | 2/2000 |
| EP | 1 754 592 A1 | 2/2007 |
| EP | 1 645 404 A1 | 4/2008 |
| JP | 63-046902 | 2/1988 |
| JP | 06-234172 | 8/1994 |
| JP | 2002-96403 | 4/2002 |
| KR | 2005093505 A * | 9/2005 |

OTHER PUBLICATIONS

Machine translation of JP 06-234172-A, patent document published Aug. 23, 1994.*

English-language translation of Notice of Reasons for Rejection issued Apr. 18, 2012 by Japan Patent Office in corresponding Japanese Patent Application No. JP 2010-504881 (4 pages).

Communication Pursuant to Article 94(3) EPC issued by the European Patent Office on Feb. 7, 2011 in corresponding Application No. EP 07 735 609.5-2307 (4 pages).

* cited by examiner

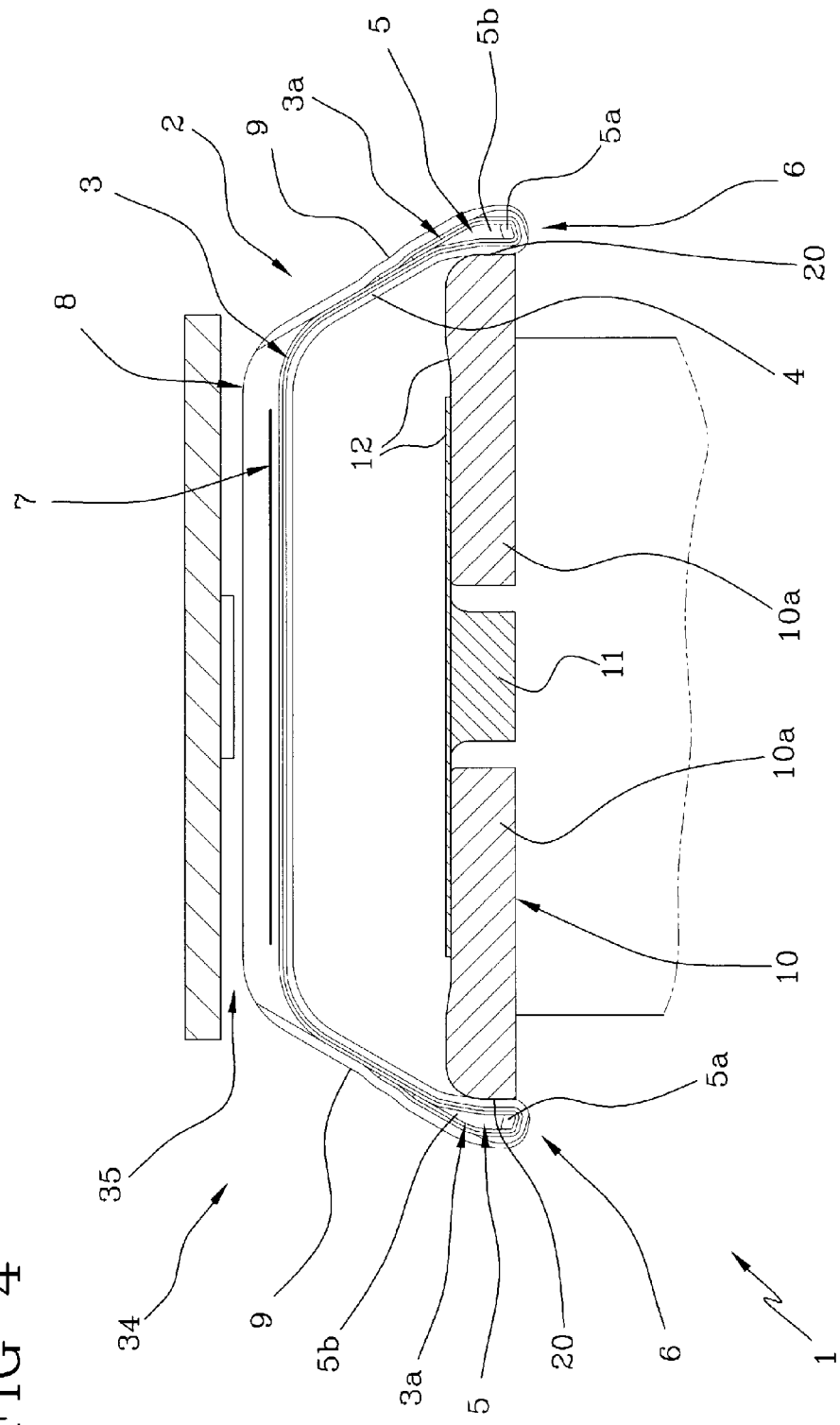

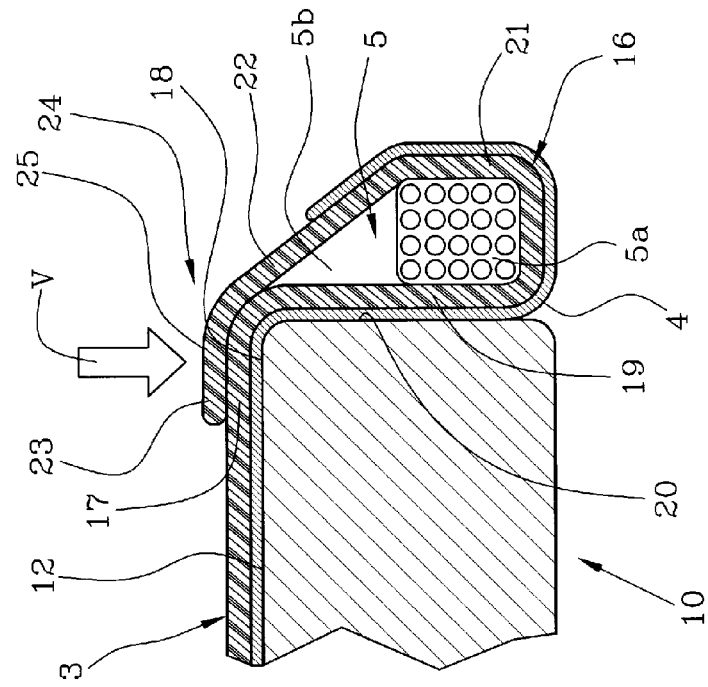
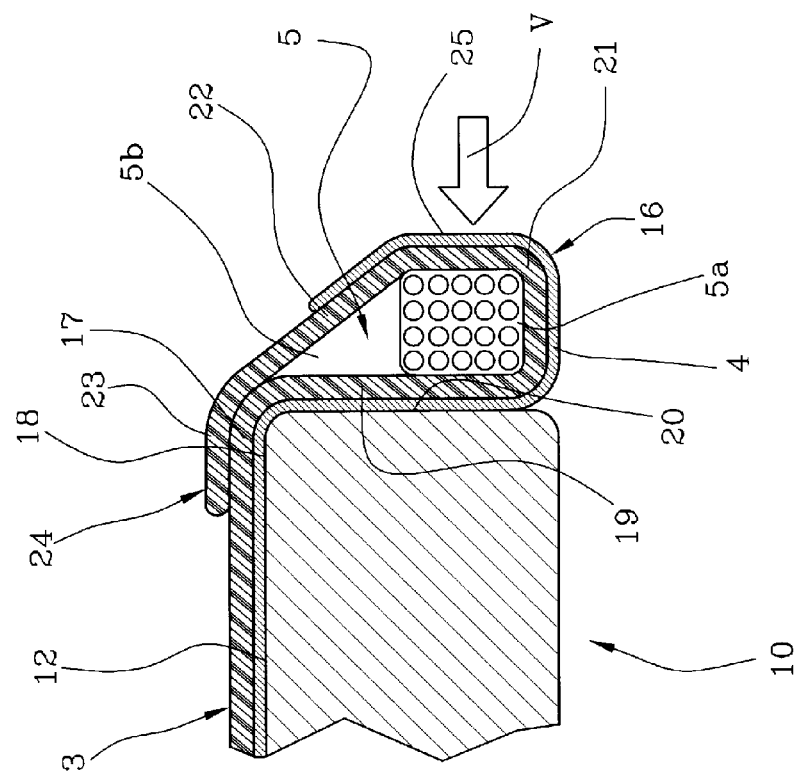

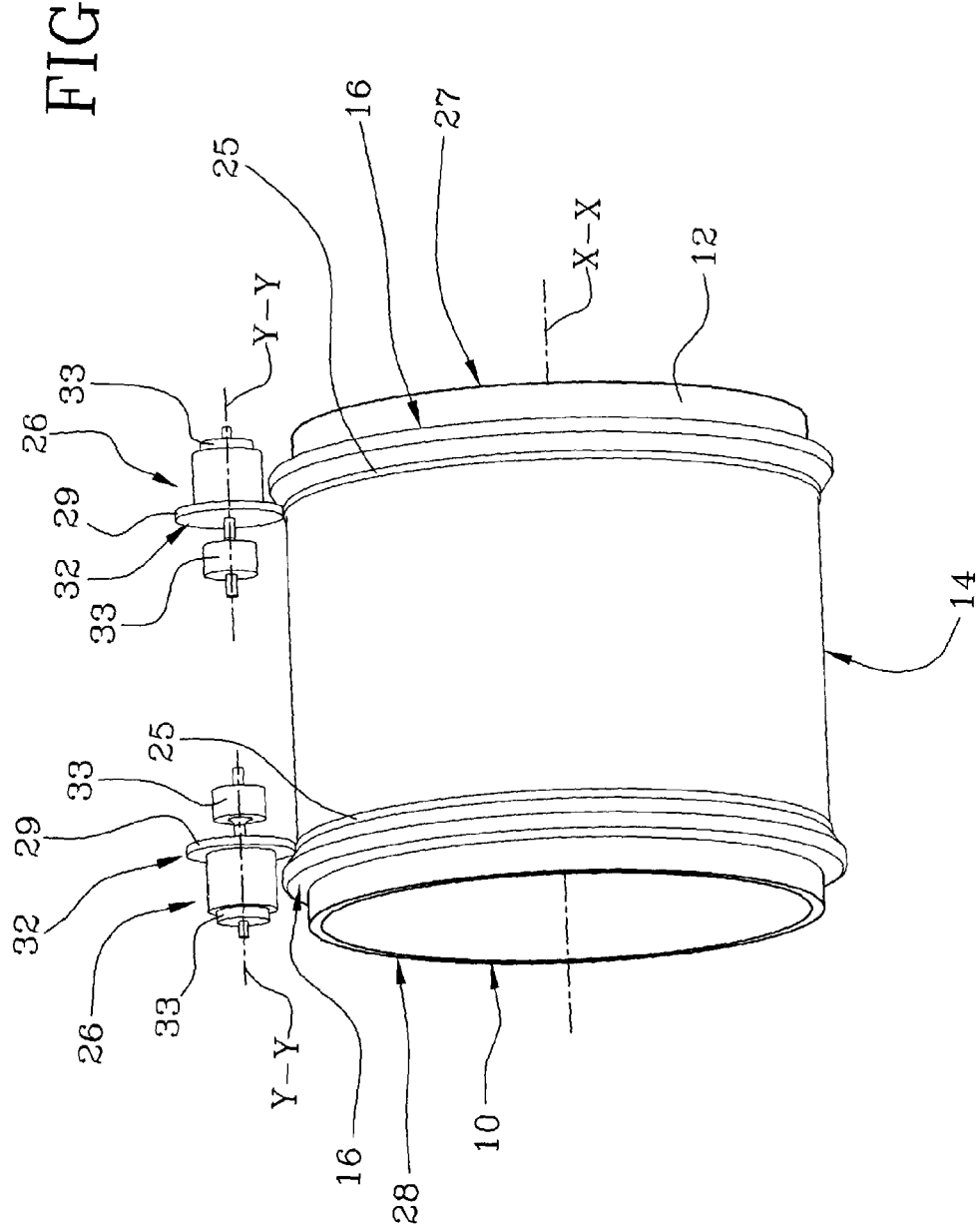

PROCESS AND APPARATUS FOR MANUFACTURING PNEUMATIC TYRES

CROSS REFERENCE TO RELATED APPLICATION

This application is a national phase application based on PCT/IB2007/051481, filed Apr. 23, 2007, the content of which is incorporated herein by reference.

BACKGROUND OF THE INVENTION

1. Field of the Invention

The present invention relates to a process and an apparatus for manufacturing pneumatic tyres.

2. Description of the Related Art

A tyre for vehicle wheels generally comprises a carcass structure including at least one carcass ply having respectively opposite end flaps in engagement with respective annular anchoring structures, integrated into the regions usually identified as "beads" and having an inner diameter substantially corresponding to a so-called "fitting diameter" of the tyre on a respective mounting rim.

Associated with the carcass structure is a belt structure comprising one or more belt layers located in radial superposed relationship with respect to each other and to the carcass ply and having textile or metallic reinforcing cords with a crossed orientation and/or substantially parallel to the circumferential extension direction of the tyre. A tread band is applied at a radially external position to the belt structure, which tread band too is of elastomeric material like other semifinished products constituting the tyre.

In addition, respective sidewalls of elastomeric material are applied at an axially external position, to the side surfaces of the carcass structure, each extending from one of the side edges of the tread band until close to the respective annular anchoring structure to the beads. In tyres of the tubeless type, an airtight coating layer, usually referred to as "liner", covers the inner tyre surfaces.

Subsequently to building of the green tyre carried out through assembly of respective components, a moulding and vulcanisation treatment is generally carried out, which treatment aims at determining the structural stabilisation of the tyre through cross-linking of the elastomeric compounds, and also at imprinting a desired tread pattern therein, as well as possible distinctive graphic marks at the tyre sidewalls.

The carcass structure and belt structure are generally made separately from each other in respective work stations, to be mutually assembled at a later time.

In more detail, manufacture of the carcass structure first contemplates application of the carcass ply or plies onto a building drum, and subsequently the annular anchoring structures to the beads are fitted or formed on the opposite end flaps of the carcass ply or plies that are then turned up around the annular structures themselves so as to enclose them in a loop and form a so-called "carcass sleeve" which is substantially cylindrical.

Simultaneously, on a second or auxiliary drum a so-called "outer sleeve" is made which comprises the belt layers applied in radially mutually superposed relationship, and possibly the tread band applied at a radially external position to the belt layers. The outer sleeve is then picked up from the auxiliary drum to be coupled to the carcass sleeve. To this aim the outer sleeve is disposed coaxially around the carcass sleeve and afterwards the carcass ply or plies are shaped into a toroidal configuration by axial mutual approaching of the beads and simultaneous admission of fluid under pressure to the inside of the carcass sleeve, so as to determine radial expansion of the carcass plies until causing adhesion of same against the inner surface of the outer sleeve.

Assembling of the carcass sleeve to the outer sleeve can be carried out on the same drum as used for manufacture of the carcass sleeve, in which case reference is made to a "unistage building process" or "unistage process".

Also known are building processes of the so-called "two-stage" type in which a so-called "first-stage drum" is employed to make the carcass sleeve, while assembly between the carcass structure and outer sleeve is carried out on a so-called "second-stage drum" or "shaping drum" onto which the carcass sleeve picked up from the first-stage drum, and subsequently the outer sleeve picked up from the auxiliary drum, are transferred.

Document EP 0 197 298 A2 discloses a method of manufacturing a tyre for vehicle wheels for accomplishment of which the beads are to be installed in the radially internal circumference of the rim on which the tyre itself is mounted. The carcass is first assembled with the respective beads provided with longitudinal-stress-resistant and compression-resistant cores, onto a drum so as to form a cylindrical green tyre in which the beads radially extend inwardly and the axially internal surfaces of the beads form a right angle with the cylindrical wall of the green tyre. The green-tyre beads are preformed/moulded and prevulcanised so as to give them a finished and steady shape. Therefore, the shape of the beads and of the immediately adjacent regions is not subject to any further modification during the following manufacturing steps. The beads are subsequently rotated through about 180° around the respective resistant cores. After giving the green tyre a toroidal shape, the green tyre is provided with tread band and sidewalls and lastly submitted to full vulcanisation.

SUMMARY OF THE INVENTION

The Applicant has noticed that where tyres are manufactured following the previously illustrated method, it is not always possible to ensure achievement of the design specifications in producing one series of tyres, as well as uniformity of the features in all tyres of said one series and repeatability of the performance offered by said tyres during use.

The Applicant in fact has found a critical area in tyres thus manufactured, in particular at the bead region designed for engagement with a respective seat of the mounting rim. More specifically, the Applicant has found that an even partial slipping off of the end flaps of the carcass ply/plies assembled with the respective annular reinforcing elements to the beads, as it is not controlled, can impair achievement of the design specifications in producing one series of tyres as well as repeatability of the performance offered by said tyres during use.

The Applicant has further noticed that manufacture of tyres following the method disclosed in document EP 0 197 298 A2, the beads are unavoidably submitted to a double moulding, the first one during preforming and prevulcanisation and the second one in the true vulcanisation mould. Said double moulding could make tyres less reliable exactly at the most critical region, i.e. the bead region, due to the important stresses suffered by said region during the whole production cycle.

The Applicant has finally felt the necessity to increase the tyre performance, with particular reference to car handling on the road.

In accordance with the present invention, the Applicant has found that by submitting a portion or circumferential strip alone of the loop turned-up around the annular anchoring structure to localised pressure and heating, tyres of better quality are obtained which also have repeatable structural and performance features.

More specifically, in a first aspect the present invention relates to a process of manufacturing pneumatic tyres comprising the steps of: applying at least one carcass ply around at least one radially external surface of a forming drum, said at least one carcass ply having axially opposite end flaps; coaxially engaging an annular anchoring structure around each of the end flaps; turning up each of the opposite end flaps of said at least one carcass ply around the respective annular anchoring structure, so as to enclose said annular anchoring structure in a loop, in order to make a carcass sleeve; positioning an outer sleeve comprising at least one belt structure to a coaxially centred position around said carcass sleeve; shaping said carcass sleeve into a toroidal configuration through radial expansion of said at least one carcass ply so as to cause application of same against a radially internal surface of said outer sleeve; wherein, after turning-up of each of the end flaps around the respective annular anchoring structure and before radial expansion of said at least one carcass ply, only a portion belonging to each of said loops is submitted to a step of carrying out heating under pressure, to make each loop integral with said annular anchoring structure.

In particular, the step of carrying out heating under pressure contemplates heating the loop for a given time, at least at said portion, and exerting a predetermined pressure on said portion alone.

It is the Applicant's opinion that heating under pressure causes a prevulcanisation in the bead region of the tyre, which as a result will make the bond between the turned-up ply and the annular anchoring structure stronger. More specifically, due to this greater strength, during the working steps subsequent to formation of the carcass sleeve provided with loops and in particular during radial expansion of the carcass ply/plies in order to shape it/them into a toroidal configuration, the turned-up flaps are prevented from slipping off, i.e. it is eliminated their tendency to partly slide relative to the annular structures and the ply portions with which they are in engagement.

In addition, the even partial consolidation of the loops enables the carcass, during the radial expansion step, to be given a greater tension than that imparted thereto until now and without the risk that slipping off may occur, so that a more rigid tyre structure will be obtained.

The Applicant has found that said greater rigidity has positive repercussions on car handling, i.e. the car response to the commands given to the steering wheel is quicker, without delays due to the excessive deformation of the tyre carcass.

The Applicant has noticed that, since said prevulcanisation is substantially localised on a portion or circumferential strip alone of the turned-up loop, the shape of the bead that is therefore submitted to cross-linking and moulding only once during the tyre vulcanisation, keeps substantially consistent with the design specifications.

The Applicant has therefore found that in this way the bead surface designed to be brought into engagement with the wheel rim appears to be even and faultless to such an extent that it is able to ensure a perfect air-tightness of the tyre on the rim.

In a further aspect, the present invention relates to an apparatus for manufacturing tyres, comprising: a forming drum having at least one radially external surface; devices for applying at least one carcass ply around said radially external surface, said at least one carcass ply having axially opposite end flaps; devices for coaxially engaging an annular anchoring structure around each of the end flaps; devices for turning up each of the opposite end flaps of said at least one carcass ply around the respective annular anchoring structure so as to enclose said annular anchoring structure in a loop, in order to make a carcass sleeve; at least one presser element to be placed close to each of the two axially opposite ends of the forming drum, said at least one presser element having a contact surface to be only applied against a portion belonging to the respective loop; devices for heating the loops at least at said portions; devices for positioning an outer sleeve comprising at least one belt structure to a coaxially centred position around the carcass sleeve; shaping devices to shape the carcass sleeve into a toroidal configuration.

The present invention, in at least one of said aspects, can have one or more of the preferred features hereinafter described.

Preferably, said portion is located close to an extremity of the end flap of said at least one carcass ply brought into contact with said at least one carcass ply. In this way, the region submitted to pre-heating under pressure keeps far away from the bead portion that will come into contact with the rim.

Alternatively, said portion is brought into contact with the respective annular anchoring structure.

Preferably, said portion is disposed to a radially external position on the carcass sleeve.

In a different embodiment, said portion is disposed to an axially external position on the carcass sleeve.

In a preferred embodiment, during the step of carrying out heating under pressure, each of said loops lies at least partly folded down against a head surface, i.e. an axially external surface, of the forming drum.

In a further embodiment, during the step of carrying out heating under pressure, the loop fully rests on the radially external surface of the forming drum.

Preferably, in a radial section of the carcass sleeve, the loop extends over a predetermined length, said portion having an extension greater than or equal to about 5% of said predetermined length.

In addition, preferably, said portion has an extension smaller than or equal to about 30% of said predetermined length.

Still more preferably, said portion has an extension included between about 5% and about 30% of said predetermined length.

Preferably, said portion has an extension greater than or equal to about 10% of said predetermined length.

In addition, said portion has an extension smaller than or equal to about 20% of said predetermined length.

Still more preferably said portion has an extension included between about 10% and about 20% of said predetermined length.

For carrying out pre-heating under pressure, preferably, said at least one carcass ply, at said portion, is brought to a temperature higher than or equal to about 150° C.

In addition, preferably, said at least one carcass ply, at said portion, is brought to a temperature lower than or equal to about 250° C.

Still more preferably, said at least one carcass ply, at said portion, is brought to a temperature included between about 150° C. and about 250° C.

More preferably, said at least one carcass ply, at said portion, is brought to a temperature higher than or equal to 180° C.

In addition, preferably, said at least one carcass ply, at said portion, is brought to a temperature lower than or equal to about 200° C.

Still more preferably, said at least one carcass ply, at said portion, is brought to a temperature included between about 180° C. and about 200° C.

Pressure applied onto said portion is preferably higher than or equal to about 0.5 bar.

In addition, preferably, a pressure lower than or equal to about 6 bars is applied onto said portion.

Still more preferably, a pressure included between about 0.5 bar and about 6 bars is applied onto said portion.

More preferably, a pressure greater than or equal to about 1 bar is applied onto said portion.

In addition, preferably, a pressure lower than or equal to about 1.5 bar is applied onto said portion.

Still more preferably, a pressure included between about 1 bar and about 1.5 bar is applied onto said portion.

In addition, said given time is longer than or equal to about 0.1 s.

In addition, preferably, said given time is shorter than or equal to about 3 s.

Still more preferably, said given time is included between about 0.1 s and about 3 s.

More preferably, said given time is longer than or equal to about 0.5 s.

In addition, preferably, said given time is shorter than or equal to about 1 s.

Still more preferably, said given time is included between about 0.5 s and about 1 s.

Operatively, at least one presser element is applied onto said portion, to obtain heating under pressure of said portion.

Preferably, the process further comprises the step of heating said at least one presser element so that said portion is heated by conduction.

Preferably, the contact surface of the presser element has a width larger than or equal to about 5% of said predetermined length.

In addition, preferably, the contact surface of the presser element has a width smaller than or equal to about 30% of said predetermined length.

Still more preferably, the contact surface of the presser element has a width included between about 5% and about 30% of said predetermined length.

More preferably, the contact surface of the presser element has a width larger than or equal to about 10% of said predetermined length.

In addition, the contact surface of the presser element has a width smaller than or equal to about 20% of said predetermined length.

Still more preferably, the contact surface of the presser element has a width included between about 10% and about 20% of said predetermined length.

In particular, said at least one presser element is defined by a roller engaged against said portion and rolled therealong.

This solution is inexpensive, simple and of compact structure, so that the other parts of the apparatus are allowed to be left unchanged.

Preferably, the roller is rolled at a peripheral average speed greater than or equal to about 0.1 m/s.

In addition, the roller is rolled at a peripheral average speed lower than or equal to about 0.4 m/s.

Still more preferably, said roller is rolled at a peripheral average speed included between about 0.1 m/s and about 0.4 m/s.

More preferably, the roller is rolled at a peripheral average speed greater than or equal to about 0.2 m/s. In addition, the roller is rolled at a peripheral average speed lower than or equal to about 0.3 m/s.

Still more preferably, said roller is rolled at a peripheral average speed included between about 0.2 m/s and about 0.3 m/s.

Alternatively, said portion is heated by radiation; for instance, it is submitted to radiation through microwaves or it is submitted to radiation through infrared rays.

In accordance with an alternative embodiment, the devices for heating the loops comprise at least one infrared source.

In accordance with a another embodiment, the devices for heating the loops comprise at least one microwave source.

In accordance with a further embodiment, the process further comprises the step of heating at least one wire belonging to the annular anchoring structure by induction, so as to heat said portion by conduction.

Preferably, shaping of the carcass sleeve is carried out on the forming drum.

The apparatus can therefore be of the "unistage" type, i.e. the shaping devices operate on the forming drum itself.

Alternatively, the carcass sleeve and outer sleeve are transferred to a shaping drum, and shaping of the carcass sleeve is carried out on said shaping drum. Further features and advantages will become more apparent from the detailed description of a preferred, but not exclusive, embodiment of a process and an apparatus for manufacturing pneumatic tyres, in accordance with the present invention.

BRIEF DESCRIPTION OF THE DRAWINGS

This description will be set out hereinafter with reference to the accompanying drawings given by way of non-limiting example, in which:

FIG. 4 shows a tyre being processed in the step during which the carcass sleeve is shaped for application of an outer sleeve thereto;

FIGS. 5a and 5b are diagrammatic views to an enlarged scale and in section of an end flap of the carcass ply seen in FIG. 4 turned up around the respective annular anchoring structure during the respective steps of carrying out heating under pressure;

FIG. 7 is a perspective view of the carcass ply disposed around the forming drum, with the end flaps in the configuration seen in FIGS. 6a and 6b, during the step of carrying out heating under pressure with the aid of rollers;

DETAILED DESCRIPTION OF THE INVENTION

Figure 1:
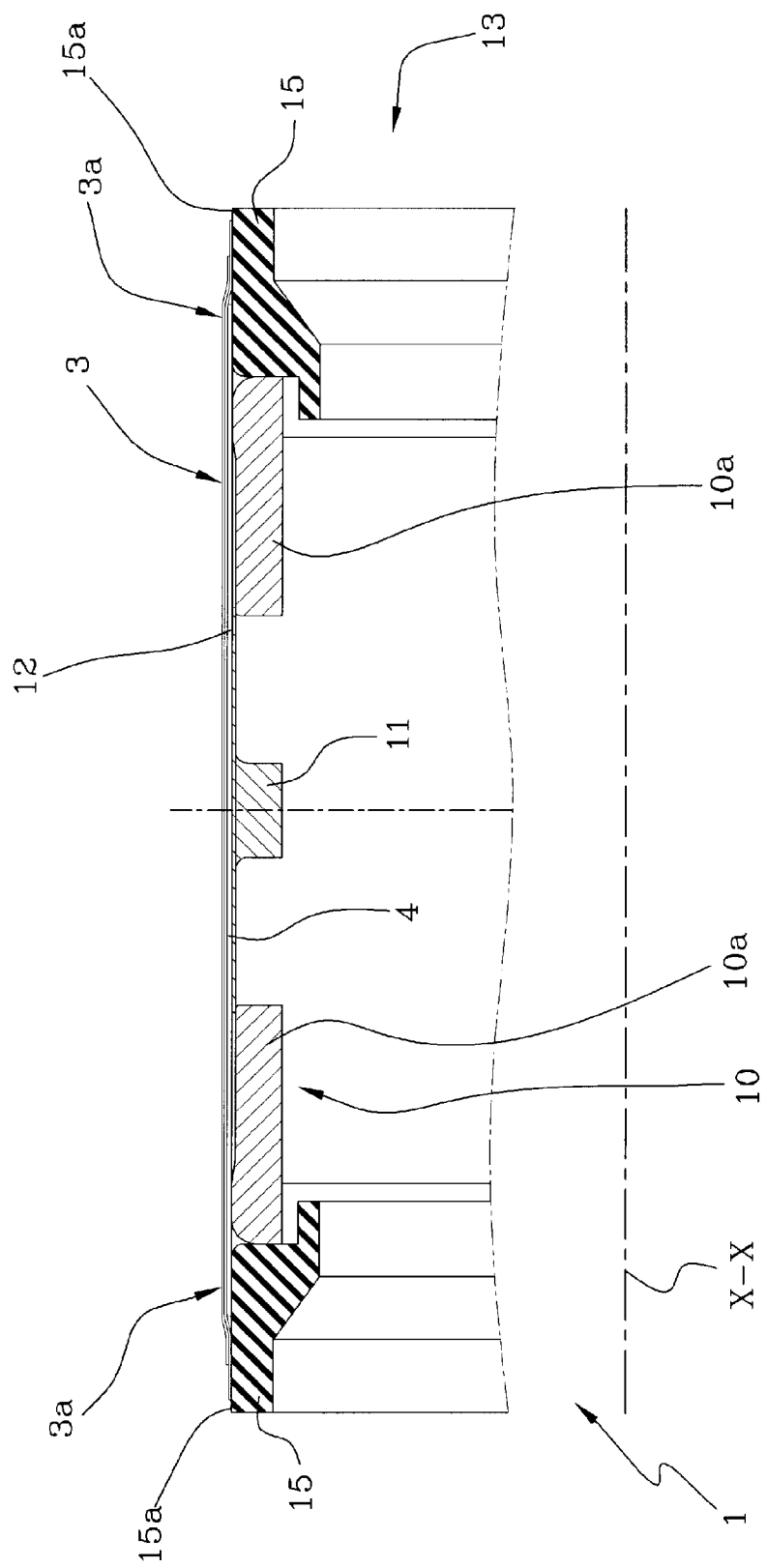
FIG. 1 diagrammatically shows a diametrical section of a carcass ply disposed around a forming drum.

With reference to the drawings, an apparatus for manufacturing pneumatic tyres for vehicle wheels suitable for putting into practice a method according to the present invention has been generally identified with reference numeral 1.

Apparatus 1 is designed to manufacture tyres 2 (FIG. 4) essentially comprising at least one carcass ply 3 preferably internally associated with a so-called liner 4, i.e. a layer of airtight elastomeric material. Two annular anchoring structures 5, each comprising a so-called "bead core" 5a carrying an elastomeric filler 5b at a radially external position, are engaged to respective end flaps 3a of the carcass ply or plies 3. Integration of the annular anchoring structures 5 takes place in the vicinity of regions usually identified as "beads" 6, at which engagement of tyre 2 with a respective mounting rim (not shown) occurs.

A belt structure 7 is circumferentially applied around the carcass ply/plies 3, and a tread band 8 circumferentially overlaps the belt structure 7. Two sidewalls 9, each extending from the corresponding bead 6 to a corresponding side edge of the tread band 8, are applied to the carcass ply/plies 3 at laterally opposite positions.

Apparatus 1 comprises a forming drum 10 having two halves 10a that can be axially moved close to each other. Halves 10a of the forming drum 10 are induced to simultaneously translate in respectively opposite directions along a drum axis "X-X", upon the action of an actuator (not shown).

The forming drum 10 may further comprise a central section 11 slidably engaging halves 10a and extending in surface-continuity relationship with said halves, so as to define therewith at a radially external position, a substantially continuous radially external surface 12.

According to a preferred embodiment, each of halves 10a and the central section 11 are made up of respective circumferential sectors radially movable between a rest condition (not shown) at which they are radially moved close to the geometric axis "X-X" to give the forming drum 10 a diametrical bulkiness smaller than a fitting diameter of the tyre being processed, to enable removal of the built tyre 2 from the forming drum itself, and a work condition at which, as shown in the figures, they extend in circumferential-continuity relationship so as to form said radially external surface 12 defining an application diameter that is greatly bigger than the fitting diameter.

According to a further preferred embodiment, the forming drum 10 is adapted to be transferred, by at least one robotized arm (not shown) or transfer devices of other type, to one or more work stations to enable carrying out of different working steps aiming at assembling the tyre 2 being processed. In more detail, the forming drum 10 is first preferably engaged in a building station 13 (FIGS. 1 to 3) in which a so-called carcass sleeve 14 is made which comprises the carcass ply/plies 3 coupled to the respective annular anchoring structures 5.

The building station 13 is preferably equipped with auxiliary support members 15, made in the form of two annular elements for example, that can removably approach the forming drum 10 on axially opposite sides. The auxiliary support members 22 have respective rest surfaces 15a that, when approaching has occurred, extend in surface-continuity relationship in the continuation of the radially external surface 12.

In the building station 13 auxiliary devices (not shown) can operate for application of first components of the carcass sleeve 14 at the forming drum 10. In more detail, these auxiliary devices can comprise one or more dispensing members supplying at least one continuous elongated element of elastomeric material while the forming drum 10 is being driven in rotation around its geometric axis "X-X", so as to form the above mentioned liner 4 on the radially external surface 12 and the rest surfaces 15a. In addition or as an alternative to liner 4, the auxiliary devices can be designed to form abrasion-preventing inserts on the rest surfaces 15a, which inserts are to be incorporated into the region of beads 6 and/or, in case of the so-called run-flat tyres, auxiliary support inserts made of elastomeric material (the so-called sidewall inserts) applied to the respective halves 10a of the forming drum 10, so that they are then incorporated into tyre 2 in the sidewall 9 region.

Subsequently to formation of said first components, devices not shown as they can be made in any convenient manner, apply the carcass ply/plies 3 around the radially external surface 12. Each carcass ply 3 can consist of a manufactured article in the form of a continuous strip previously cut to the circumferential extension of the radially external surface 12 and delivered towards said surface, while the forming drum 10 is rotating around its geometric axis "X-X", so as to cause winding of said strip around the radially external surface 12.

In a preferred embodiment, the application devices comprise members for sequentially applying a plurality of strip-like elements disposed transversely of the circumferential extension of the radially external surface 12, while the forming drum 10 is being driven in rotation following a step-by-step operation. It is to be pointed out that, to the aims of the present description, by the term "strip-like element" it is intended an elementary component of elongated conformation comprising one or more reinforcing cords coupled to an elastomeric matrix the length of which subtends the width of the carcass ply/plies 3 and having a width corresponding to a fraction of the circumferential extension of said carcass ply/plies.

Thus the carcass ply/plies 3 are directly formed on the forming drum 10, by means of the strip-like elements applied in mutually approached relationship to cover the whole circumferential extension of the radially external surface 12.

In accordance with a preferred embodiment of the building process, the radially external surface 12 has a smaller axial dimension than the width of said at least one carcass ply 3, so that the end flaps 3a of the carcass ply/plies 3 disposed on the forming drum 10 axially project from the opposite ends of the radially external surface 12 and are at least partly supported by said rest surfaces 15a.

Figure 2:
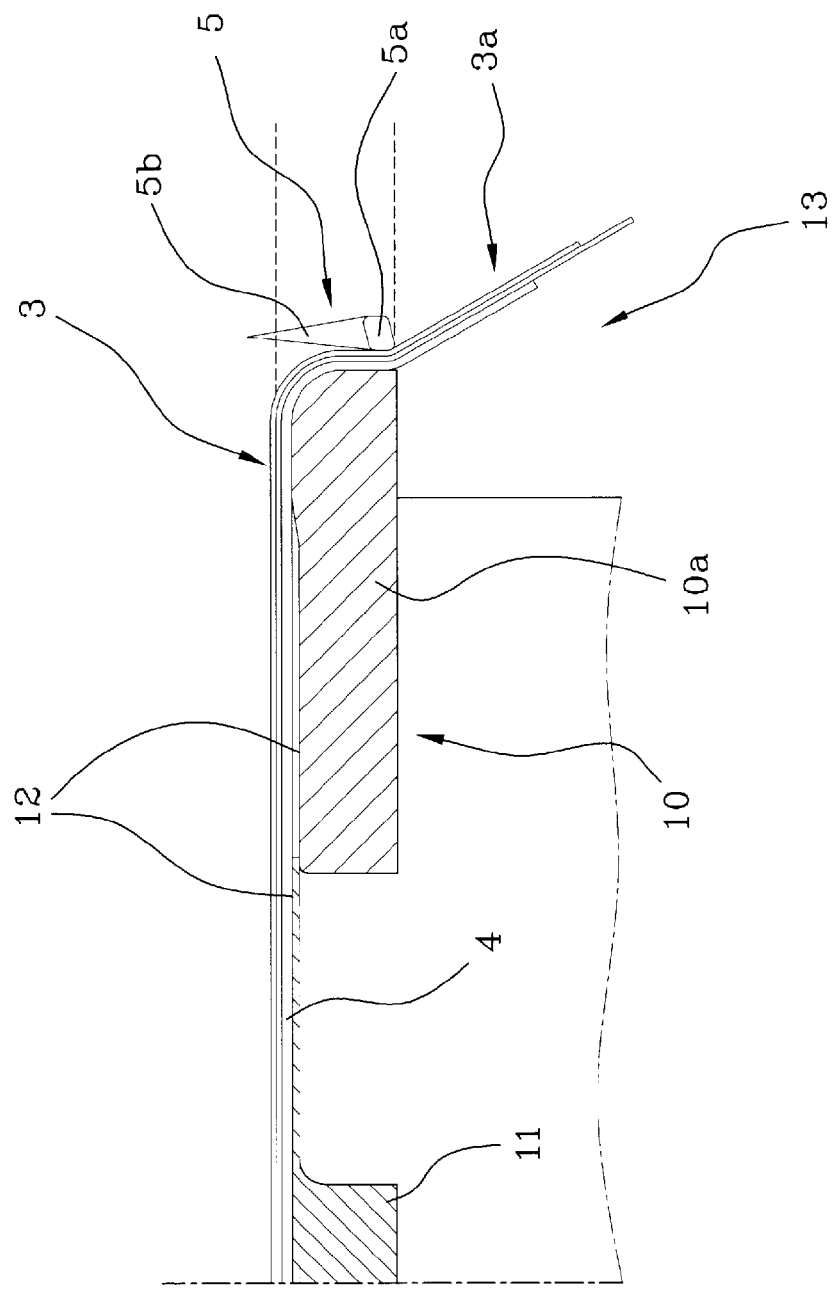
FIG. 2 shows a step in which the annular anchoring structures are coaxially fitted on the respective end flaps of the carcass ply, to an enlarged scale with respect to FIG. 1.

According to said preferred embodiment, when formation of the carcass ply/plies 3 has been completed, the auxiliary support members 15 are axially moved apart from the respective halves 10a of the forming drum 10, so that the rest surfaces 15a can be removed from liner 4 and the carcass ply/plies 3, by slipping off. Removal of the rest surfaces 15a makes it possible to fold down the end flaps 3a of the carcass ply/plies 3 applied around the forming drum 10, towards the geometric axis "X-X" of the forming drum 10 itself, for example with the aid of rollers or other devices not shown as they can be made in any convenient manner (FIG. 2).

Location members not shown as they can be made in known manner, carry out fitting of each of the annular anchoring structures 5 coaxially around one of the end flaps 3a of the carcass ply/plies 3 folded down towards the geometric axis "X-X".

In this case the inner diameter of the annular anchoring structures 5 is smaller than the diameter of the radially external surface 12. Consequently, the annular anchoring structures 5 fitted on the end flaps 3a lend themselves to be located in axial abutment relationship, each against the corresponding half of the forming drum 10.

Figure 3:
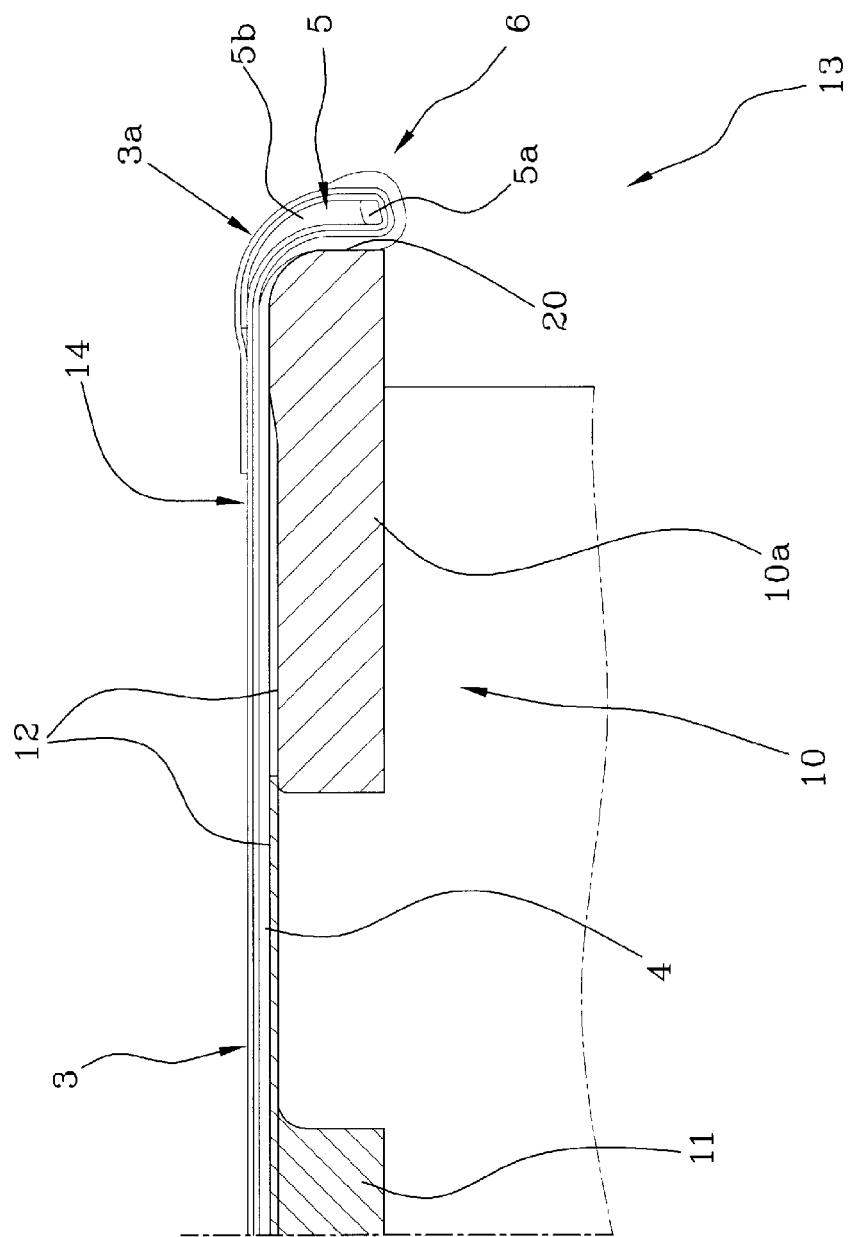
FIG. 3 shows a step of turning up the end flaps of the carcass ply around the respective annular anchoring structures, to an enlarged scale with respect to FIG. 1.

When location has been completed, turning-up members not shown carry out turning-up of each of the end flaps 3a around the respective annular anchoring structure 5, so as to enclose the annular anchoring structure 5 in a loop 16 and cause formation of said carcass sleeve 14 (FIGS. 3, 5a, 5b).

Once turning-up has been completed, loop 16 (shown in section and to an enlarged scale in FIGS. 5a and 5b) has a first portion 17 lying substantially close to the forming drum 10 at an end region 18 of the radially external surface 12 of said drum 10, a second portion 19 engaged against a head (i.e. axially external) surface 20 of the drum 10 itself, with possible interposition of liner 4, a third portion 21 turning around and lying against the bead core 5a of the annular anchoring structure 5, a fourth portion 22 engaged against filler 5b, and a fifth portion 23, corresponding to an extremity of the end flap 3a brought into contact with the first portion 17. The first portion 17 and fifth portion 23 in mutual contact identify a closure region 24 of loop 16.

In accordance with an alternative embodiment of the building process, the radially external surface 12 of the forming drum 10 has an axial size that is substantially equal to or larger than the width of said at least one carcass ply 3 and the building station 13 is not equipped with the above mentioned auxiliary support members 15.

The inner diameter of the annular anchoring structures is bigger than or equal to the diameter of the radially external surface 12 so that, once said annular structures 5 are fitted on drum 10, they are disposed in a position radially external to the carcass ply 3, liner 4 and radially external surface 12 of drum 10 (FIGS. 6a, 6b, 7 and 8). After turning up, as shown in section and to an enlarged scale in FIGS. 6a and 6b, the first portion 17 and second portion 19 of the loop lie in mutual alignment and close to the forming drum 10 at the end region 18 of the radially external surface 12 of said drum 10. The third portion 21 extends radially away from surface 12 of drum 10, turning then around the bead core 5a of the annular reinforcing structure 5. The fourth portion 22 is engaged against filler 5b and converges towards drum 10. The fifth portion 23, corresponding to the extremity of the end flap 3a, is brought into contact with the first portion 17 and identifies the closure region 24 of loop 16.

Figure 8:
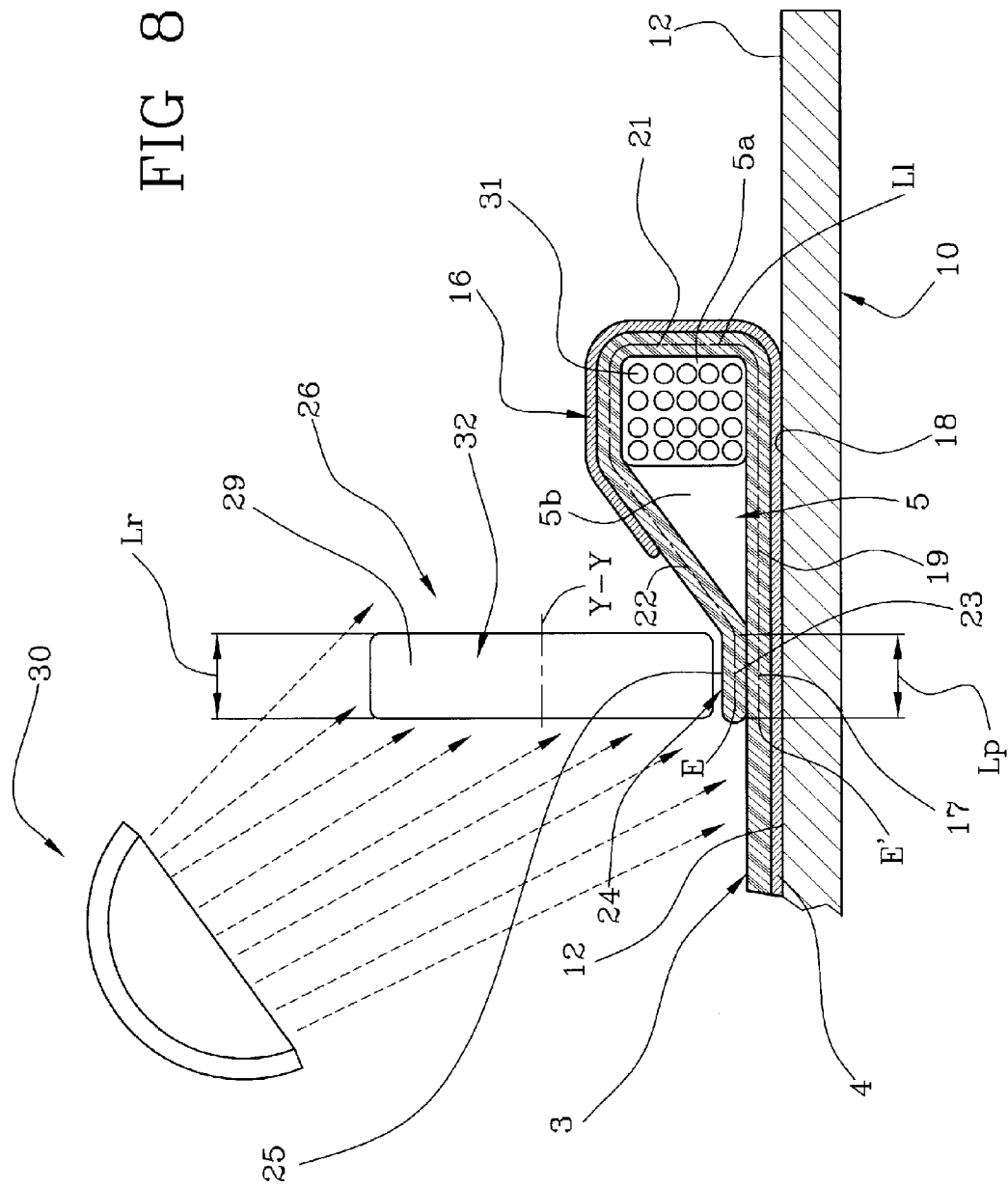
FIG. 8 shows the end flap seen of FIGS. 6a and 6b during a variant of the step of carrying out heating under pressure seen in FIG. 7.

Loop 16, made up of five portions 17, 19, 21, 23 disposed in mutual succession, has a predetermined length "$L_l$" (highlighted in FIG. 8). More specifically, the predetermined length "$L_l$" corresponds to the extension of the ply 3 portion included between an end point "E" of the ply itself and the corresponding radially internal point "E'" of ply 3 in the cylindrical carcass sleeve, in contact with said end point "E".

Irrespective of the arrangement of loop 16 on the forming drum 10, after turning up of each of the end flaps 3a around the respective annular anchoring structure 5, a portion 25 alone belonging to each of loops 16 and substantially extending parallel to the respective annular anchoring structure 5, like a circumferential strip (clearly visible in the example in FIG. 7) is advantageously submitted to a step of carrying out heating under pressure, so as to make said loop 16 integral with said annular anchoring structure 5.

Heating under pressure aims at carrying out a localised prevulcanisation on said portion or circumferential strip 25, so as to steadily join the carcass ply 3 to the annular anchoring structures 5 without during this step, submitting beads 6 to any shaping/moulding. After heating under pressure, beads 6 have a shape substantially identical with that they had before heating.

To this aim, the step of carrying out heating under pressure takes place by heating loop 16 for a given time "t" to a predetermined temperature "T", at least at portion 25, and exerting a predetermined pressure "P" on said portion 25 alone. In FIGS. 5a, 6a, 5b and 6b supply of heat and pressure is diagrammatically represented by arrow "V" directed to portion 25. Heating under pressure causes partial mutual penetration of the carcass ply 3 and other elements of loop 16 and pre-crosslinking of same only at portion 25.

Preferably, said heating too is restricted to portion 25 and regions of the loop 16 close thereto, so as to alter the bead 6 features as little as possible.

In accordance with a preferred embodiment (FIGS. 5a, 6a), portion 25 submitted to localised pre-vulcanisation is placed at an extremity of the end flap 3a brought into contact with an axially innermost portion of the carcass ply 3, i.e. the closure region 24 of loop 16.

Under this situation, during heat and pressure supply, a mutual penetration of the plies occur. The threads or wires of ply 3 belonging to the first portion 17 are interposed between the threads or wires belonging to the fifth portion 23 thereby giving rise to a steady bond between said plies.

Figure 6A:
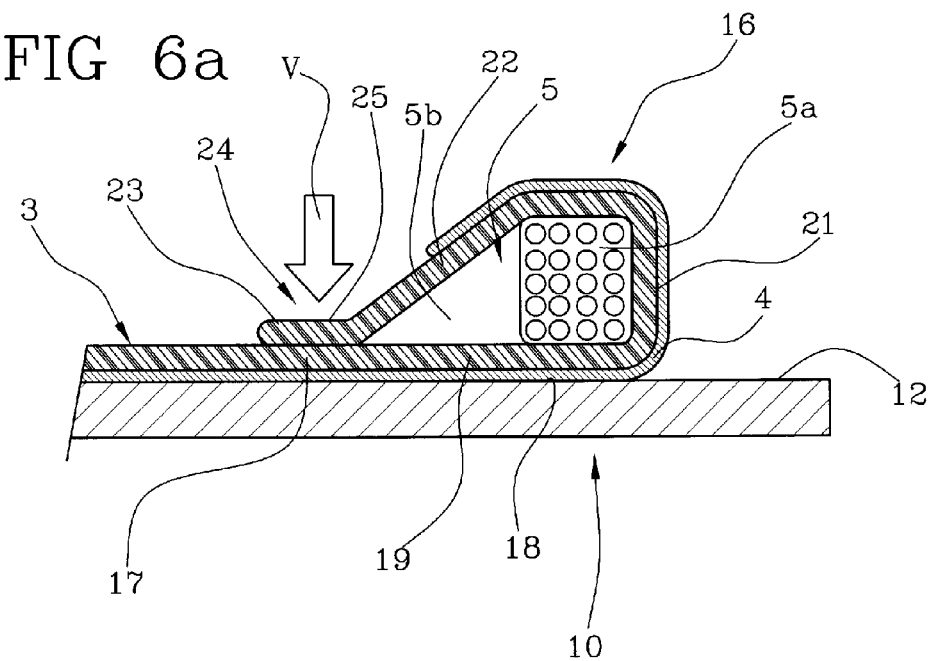
FIGS. 6a and 6b show the same steps seen in FIGS. 5a and 5b with the end flap disposed in an alternative configuration.
Figure 6B:
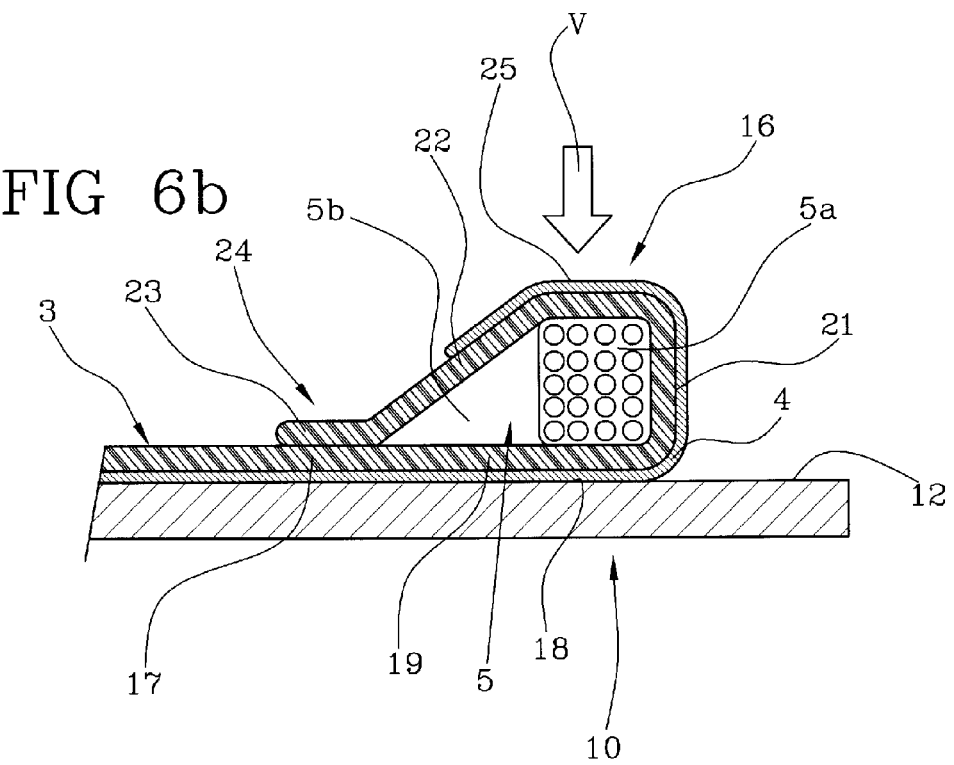

According to a further embodiment shown in FIGS. 5b and 6b, portion 25 is placed on a portion of loop 16 brought into contact with the respective annular anchoring structure 5. In particular, portion 25 is placed on the third portion 21 of loop 16 in contact with the bead core 5a, which means that portion 25 in this case is in contact with a first wall of the bead core 5a, while a second wall of the bead core 5a the force of which is of opposite direction (of arrow "V") with respect to the force causing this pressure on said first wall, is in turn in contact with a portion of said ply 3.

In short, said localised prevulcanisation carried out by heating under pressure preferably occurs on loop portions enabling opposition of forces on two opposite portions of the carcass ply (portions 25 and 17 in the examples in FIGS. 5a, 5b, 6a, 6b), said opposition of forces taking place both directly between the carcass ply portions themselves and indirectly with interposition of the bead core 5a.

Portion 25 in the configuration in FIG. 5b is disposed at an axially external position on the carcass sleeve 14 while in the configurations in FIGS. 5a, 6a and 6b it is disposed at a radially external position on the carcass sleeve 14. The extension or width "$L_p$" of portion 25, measured in a radial section of the carcass sleeve 14, is a limited fraction of the predetermined length "$L_l$" of loop 16 (FIG. 8).

The Applicant has found it more desirable for the extension "$L_p$" of portion 25 to be included between about 5% and about 30% of the predetermined length "$L_l$".

Still more preferably, said extension "$L_p$" is included between about 10% and about 20% of the predetermined length "$L_l$".

To carry out heating under pressure, apparatus 1 comprises at least one presser element 26 to be placed close to each of the two axially opposite ends 27, 28 of the forming drum 10. Each of presser elements 26 has a contact surface 29 to be applied against portion 25.

To this aim, the contact surface 29 of the presser element 26 has a width "$L_r$" substantially equal to the extension "$L_p$" of portion 25, i.e. preferably included between about 5% and about 30% of the predetermined length "$L_l$" of loop 16 and, still more preferably, included between about 10% and about 20% of said predetermined length "$L_l$" (FIG. 8).

Apparatus 1 further comprises devices 30 for heating loops 16 at least at the respective portions or circumferential strips 25 and preferably only on said portions 25.

According to a preferred embodiment, the presser element 26, in particular the contact surface 29, is heated and transmits heat by conduction to portion 25 against which it is pressed. By way of example, heating can be obtained by means of electric resistors, not shown, operatively associated with the presser element 26.

Alternatively, portion 25 is directly heated by induction through radiation, by means of an infrared source or a microwave source for example. The same source can also irradiate and heat the presser element 26 (as diagrammatically shown in FIG. 8).

According to a further variant, at least one wire 31 belonging to the annular anchoring structure 5 is heated by induction, so that heat is transmitted by wire 31 to loop 16 and portion 25 by conduction.

Through heating, the carcass ply 3 at portion 25 is brought to a temperature preferably included between about 150° C. and about 250° C. and more preferably between about 180° C. and about 200° C.

In addition, a pressure included between about 0.5 bar and about 6 bars and more preferably between about 1 bar and about 1.5 bar is applied onto portion 25.

Portion 25 is heated and submitted to the predetermined pressure "P" for a time "t" included between about 0.1 and about 3 s and more preferably included between about 0.5 s and about 1 s.

In accordance with a preferred embodiment shown in FIG. 7, apparatus 1 comprises a pair of rollers 32, each of them defining a presser element 26. Each roller 32 has a rolling side surface defining the contact surface 29, which is engaged against portion 25 and rolled along said portion 25 following a continuous or step-by-step course.

In the step of carrying out heating under pressure, each roller 32 is brought into contact with the carcass sleeve 3 by actuating devices not shown, that press said rollers 32 on the carcass ply 3 and preferably also cause the rollers 32 themselves to move away from drum 10 during the other building steps.

Roller 32 is supported by a frame, not shown, by means of rotating joints 33 and rotation of roller 32 on the carcass sleeve 3 is preferably caused by rotation of the forming drum 10 around its geometric axis "X-X". In more detail, each roller 32 is idly mounted on said frame with its rotation axis "Y-Y" parallel to the geometric axis "X-X" of the forming drum 10 and said drum 10, through its rotation, drives rollers 32 in rotation.

The given time "t" during which areas in succession of the carcass ply 3 disposed along said portion or circumferential strip 25 keep in contact with roller 32, and consequently the given time "t" during which the individual area is heated and submitted to the predetermined pressure "P" depends on the peripheral speed "v" of the roller 32 and forming drum 10.

Irrespective of whether it is drum 10 that rotates around its geometric axis "X-X" or it is roller 32 that rotates around drum 10, the peripheral average speed "v" of the rolling side surface of roller 32 relative to the forming drum 10 is preferably included between about 0.1 m/s and about 0.4 m/s, more preferably included between about 0.2 m/s and about 0.3 m/s.

Once the step of carrying out heating under pressure has been completed, in accordance with a "unistage building process" or "unistage process", the forming drum 10 carrying the carcass sleeve 14 can be transferred from the building station 13 to a shaping station 34 (FIG. 4), to receive an outer sleeve 35 in engagement, said outer sleeve 35 integrating the belt structure 7 preferably already coupled to the tread band 8.

The outer sleeve 35 is disposed at a coaxially centred position around the carcass sleeve 14 carried by the forming drum 10.

Shaping devices acting on the forming drum 10 operate in the shaping station 34 to shape the carcass sleeve 14 into a toroidal configuration (FIG. 4), so as to cause application of same against a radially internal surface of the outer sleeve 35.

It will be recognised that the shaping station can be coincident with the building station and in this case the forming drum 10 is not shifted from the position at which building of the carcass sleeve 14 has been carried out.

Alternatively, in accordance with a so-called "two-stage" building process, apparatus 1 further comprises a shaping drum, not shown, and devices designed to transfer the carcass sleeve 14 and outer sleeve 35 onto said shaping drum. Shaping of the carcass sleeve 14 is carried out on the shaping drum.

Irrespective of the adopted building process, i.e. a unistage or two-stage building process, during the shaping step the steady anchoring of loops 16 to the respective annular anchoring structures 5, obtained through said heating under pressure, enables a great tension to be given to the carcass ply 3 without the turned-up end flaps 3a being subjected to an even partial slipping off.

When the shaping step has been completed, the forming drum 10 can be removed from the shaping station 34 to be optionally transferred to at least one additional work station (not shown), intended for manufacture of the sidewalls 9, for example.

When building has been completed, tyre 2 can be removed from the shaping drum 10, after radial contraction of the latter, to be submitted to a vulcanisation step achievable in any convenient manner.

The invention claimed is:

1. A process of manufacturing pneumatic tyres comprising:
    applying at least one carcass ply around at least one radially external surface of a forming drum, said at least one carcass ply having axially opposite end flaps;
    coaxially engaging an annular anchoring structure around each of the end flaps;
    turning up each of the opposite end flaps of said at least one carcass ply around a respective annular anchoring structure, so as to enclose each annular anchoring structure in a respective loop, in order to make a carcass sleeve;
    in a radial section of the carcass sleeve, each of said loops extending over a predetermined length and comprising a portion having an extension less than or equal to about 30% of said predetermined length;
    positioning an outer sleeve comprising at least one belt structure to a coaxially centered position around said carcass sleeve; and
    shaping said carcass sleeve into a toroidal configuration through radial expansion of said at least one carcass ply so as to cause application of said carcass ply against a radially internal surface of said outer sleeve,
        wherein, after turning-up of each of the end flaps around the respective annular anchoring structure and before radial expansion of said at least one carcass ply, only the portion belonging to each of said loops is submitted to heating under pressure, to make each loop integral with said annular anchoring structure, each said portion being located a distance from said annular anchoring structure and at an extremity of the end flap of said at least one carcass ply in contact with said at least one carcass ply.

2. The process as claimed in claim 1, wherein heating under pressure comprises heating each of said loops for a given time, at said portion, and exerting a predetermined pressure on said portions alone.

3. The process as claimed in claim 1, wherein each of said portions is disposed at a radially external position on the carcass sleeve.

4. The process as claimed in claim 1, wherein, during the step of carrying out heating under pressure, each of said loops lies at least partly folded down against an axially external surface of the forming drum.

5. The process as claimed in claim 1, wherein during the step of carrying out heating under pressure, each of said loops fully rests on a radially external surface of the forming drum.

6. The process as claimed in claim 1, wherein, in a radial section of the carcass sleeve, each of said portions has an extension greater than or equal to about 5% of said predetermined length.

7. The process as claimed in claim 1, wherein, in a radial section of the carcass sleeve, each of said portions has an extension greater than or equal to about 10% of said predetermined length.

8. The process as claimed in claim 1, wherein, in a radial section of the carcass sleeve, each of said portions has an extension smaller than or equal to about 20% of said predetermined length.

9. The process as claimed in claim 1, wherein said at least one carcass ply, at each said portion, is brought to a temperature higher than or equal to about 150° C.

10. The process as claimed in claim 1, wherein said at least one carcass ply, at each said portion, is brought to a temperature lower than or equal to about 250° C.

11. The process as claimed in claim 1, wherein said at least one carcass ply, at each said portion, is brought to a temperature higher than or equal to about 180° C.

12. The process as claimed in claim 1, wherein said at least one carcass ply, at each said portion, is brought to a temperature lower than or equal to about 200° C.

13. A process as claimed in claim 1, wherein a pressure higher than or equal to about 0.5 bar is applied to each said portion.

14. The process as claimed in claim 1, wherein a pressure lower than or equal to about 6 bars is applied to each said portion.

15. The process as claimed in claim 1, wherein a pressure greater than or equal to about 1 bar is applied to each said portion.

16. The process as claimed in claim 1, wherein a pressure lower than or equal to about 1.5 bar is applied to each said portion.

17. The process as claimed in claim 2, wherein said given time is longer than or equal to about 0.1 second.

18. The process as claimed in claim 2, wherein said given time is shorter than or equal to about 3 seconds.

19. The process as claimed in claim 2, wherein said given time is longer than or equal to about 0.5 second.

20. The process as claimed in claim 2, wherein said given time is shorter than or equal to about 1 second.

21. The process as claimed in claim 1, wherein at least one presser element is applied to each said portion, to obtain heating under pressure of each said portion.

22. The process as claimed in claim 21, further comprising the step of heating said at least one presser elements so that each said portion is heated by conduction.

23. The process as claimed in claim 21, wherein said at least one presser elements is defined by a roller engaged against each said portion and rolled therealong.

24. The process as claimed in claim 23, wherein the rollers are rolled at a peripheral average speed greater than or equal to about 0.1 m/s.

25. The process as claimed in claim 23, wherein the rollers are rolled at a peripheral average speed lower than or equal to about 0.4 m/s.

26. The process as claimed in claim 23, wherein the rollers are rolled at a peripheral average speed greater than or equal to about 0.2 m/s.

27. The process as claimed in claim 23, wherein the rollers are rolled at a peripheral average speed lower than or equal to about 0.3 m/s.

28. The process as claimed in claim 1, wherein each said portion is heated by radiation.

29. The process as claimed in claim 28, wherein each said portion is submitted to radiation through microwaves.

30. The process as claimed in claim 28, wherein each said portion is submitted to radiation through infrared rays.

31. The process as claimed in claim 1, wherein shaping of the carcass sleeve is carried out on the forming drum.

32. The process as claimed in claim 1, wherein the carcass sleeve and outer sleeve are transferred to a shaping drum, shaping of the carcass sleeve being carried out on said shaping drum.

* * * * *